United States Patent
Dikken et al.

(10) Patent No.: US 7,906,953 B2
(45) Date of Patent: Mar. 15, 2011

(54) BOOSTING TECHNIQUE FOR A BI-DIRECTIONAL SWITCH IN A POWER CONVERTER

(75) Inventors: Jan Dikken, Wijchen (NL); Peter T. J. Degen, Arnhem (NL)

(73) Assignee: NXP B.V., Eindhoven (NL)

( * ) Notice: Subject to any disclaimer, the term of this patent is extended or adjusted under 35 U.S.C. 154(b) by 381 days.

(21) Appl. No.: 11/995,599

(22) PCT Filed: Jul. 19, 2006

(86) PCT No.: PCT/IB2006/052470
§ 371 (c)(1),
(2), (4) Date: Jun. 25, 2008

(87) PCT Pub. No.: WO2007/010489
PCT Pub. Date: Jan. 25, 2007

(65) Prior Publication Data
US 2008/0259657 A1 Oct. 23, 2008

(30) Foreign Application Priority Data
Jul. 20, 2005 (EP) .................... 05106656

(51) Int. Cl.
G05F 1/00 (2006.01)
H02M 7/217 (2006.01)
H02M 3/335 (2006.01)
(52) U.S. Cl. .............. 323/288; 363/21.06; 363/21.14; 363/127

(58) Field of Classification Search ............... 363/21.04, 363/21.06, 21.12, 21.14, 127; 323/282, 288
See application file for complete search history.

(56) References Cited

U.S. PATENT DOCUMENTS

| 4,736,151 A | 4/1988 | Dishner |
| 5,815,384 A * | 9/1998 | Hammond et al. ............. 363/26 |
| 6,762,627 B1 * | 7/2004 | Gater ............................ 327/58 |
| 6,788,554 B2 * | 9/2004 | Havanur .................... 363/21.06 |
| 7,403,200 B2 * | 7/2008 | Abdoulin ..................... 345/211 |
| 2004/0136207 A1 | 7/2004 | Havanur |
| 2006/0043499 A1 * | 3/2006 | De Cremoux et al. ........ 257/401 |

FOREIGN PATENT DOCUMENTS

WO 2006095327 A2 9/2006

OTHER PUBLICATIONS

Williams, R, K; et al "Single Package 30-V Battery Disconnect Switch Facilitates Battery Multiplexing in Notebook Computers" Applied Power Electronics Conference and Exposition, 1998. vol. 2, Feb. 15, 1998, pp. 691-699.

* cited by examiner

Primary Examiner — Gary L Laxton
Assistant Examiner — Emily Pham

(57) ABSTRACT

A bi-directional switch for a power converter comprises first and second transistors (SW1, SW2) and a floating supply capacitor (C2) associated with the second transistor (SW2). The drive circuit and/or gate of the first transistor (SW1) is charged by the floating supply capacitor (C2) of the second transistor (SW2). The charging takes place at a predetermined moment in the switching cycle, and in particular at a moment in the switching cycle when the voltage across the bi-directional switch is substantially a minimum.

12 Claims, 12 Drawing Sheets

BOOSTING TECHNIQUE FOR A BI-DIRECTIONAL SWITCH IN A POWER CONVERTER

The present invention relates to the field of power conversion. The invention is particularly, although not exclusively, for use in controlling a bi-directional switch in a switched mode power converter.

Switched mode power converters are widely used in the electronics industry to convert one DC level voltage to another for supply to a load. Typically, a transformer is provided which isolates the voltage source on the primary side from the load on its secondary side. The input DC voltage is periodically switched across the primary side of the transformer using one or more power switches. Energy is stored in an output inductor and a regulated voltage is supplied to the load on the secondary side by switching the flow of current into the output inductor. Circuitry on the secondary side rectifies the switched and isolated voltage across the secondary winding.

FIG. 1 shows the secondary side of a forward DC/DC power converter as described in co-pending European Patent Application No 05 101 931.3. In the arrangement of FIG. 1, the secondary side rectifier circuit comprises a first output filter $C_{out}$ coupled to the secondary winding, and a bi-directional switch, formed from first and second MOSFET devices SW1, SW2, coupled in anti-series in common drain mode between the secondary winding and the first output filter. A freewheeling diode SW3, connected in shunt with the secondary winding, conducts current to the load $R_{load}$ when no voltage or a negative voltage is present across the secondary winding. The bi-directional switch is operable to block current between the secondary winding and the first output filter, thereby (temporarily) isolating the secondary side of the converter from the secondary winding of the transformer.

The use of a bi-directional switch provides the advantage that the secondary side can be switched off or can be regulated independently at the secondary side. When the bi-directional switch is placed high side, as illustrated in FIG. 1, several independent outputs can be taken from the same secondary transformer winding, making it suitable for PC applications which require a plurality of different voltage levels. DMOS transistors, which are able to withstand relatively high voltages, are typically used to form the bi-directional switch (SW1 and SW2), and the use of vertical DMOS transistors enables the circuit to be integrated into a single chip.

FIG. 2 illustrates typical signals at both sides of the bi-directional switch (i.e. voltages at node X and node Y) during a normal switching cycle of the power converter when the bi-directional switch is placed at the high side of the secondary transformer, as shown in FIG. 1.

At about t=10 us, transistors SW1 and SW2 are off and transistor SW3 is on. The voltage at the secondary side of the transformer is negative (VN(X)=−20V) and the coil current $I_{coil}$ flows through transistor SW3. Shortly thereafter, the voltage across the secondary winding of the transformer reverses (VN(X)=+20V).

At about t=11.4 us, transistor SW2 is switched on and transistor SW3 is switched off. The coil current $I_{coil}$ will first flow through the body diode of transistor SW3, so node Y goes one diode voltage negative. Node X is pulled to a voltage that is one diode voltage higher than node Y because transistor SW1 is still off, so the voltage at node X (VN(X)) falls to almost zero. The skilled person will appreciate that it is possible to switch transistor SW1 on as soon as node X becomes positive, but in the present example transistor SW1 is switched on when node Y goes positive and transistor SW1 is switched off when node Y drops to zero again. The input voltage (about 20V in this example, but it can be more than 60V for a 12V output) is now entirely across the leakage inductance of the transformer. The current through the secondary transformer winding and the bi-directional switch increases and the current through the body diode of transistor SW3 decreases at a rate dependent upon the size of the leakage inductance (200 nH in this example).

At about t=11.6 us, the current through the body diode of transistor SW3 has dropped to zero and the diode blocks. After that the voltage at node X and Y rise and transistor SW1 is switched on. The parasitic capacitances at nodes X and Y start resonating with the leakage inductance of the transformer. A small snubber circuit formed by capacitor CS and resistor RS provides damping. Because node Y is now at a higher voltage compared to the output voltage the coil current $I_{coil}$ starts increasing.

At about t=15.5 us, the input voltage reverses and nodes X and Y are discharged to zero. Transistor SW1 is switched off and the current will flow through its body diode. The coil current $I_{coil}$ decreases again because the voltage at node Y has become negative compared to the output voltage. The negative input voltage is now entirely across the leakage inductance of the transformer. The current through the secondary transformer winding and the bi-directional switch decreases and the current through the body diode of transistor SW3 increases with a rate dependent upon the leakage inductance. When current is still flowing through the body diode of transistor SW1, node X is clamped to zero. This time interval is called the commutation time, which provides some time to switch off transistor SW1.

At about t=15.7 us, the current through the body diode of transistor SW1 has dropped to zero and the diode blocks. After that, node X is discharged and becomes negative (VN (X)=−20V). Transistor SW2 is switched off and transistor SW3 is switched on. The skilled person will appreciate that if the commutation time is very short, and transistor SW1 is not yet switched off at the end of that period, there will be a small time interval in which there is a short circuit. Node X will remain clamped at zero and a fast rising current spike in the negative direction will occur. To prevent this the commutation time can be enlarged by increasing the leakage inductance or by adding extra series inductance. Alternatively, a better solution would be to switch off transistor SW1 a little earlier. This could be done with a combination of a delay and a Phase Locked Loop (PLL) which is locked to the falling edge of node Y.

FIG. 3 shows how transistor SW1 is conventionally controlled. In particular, an extra transformer is used which directly controls the gate of transistor SW1. The disadvantage of this technique is the additional cost of the transformer, which is relatively expensive, and the space taken up by the transformer on the board. The present invention aims to control the gate of transistor SW1 in an efficient way without a transformer.

The present invention is concerned with an improved technique for the control of the bi-directional switch. In particular, the gates of the transistors have to be switched with respect to their sources. Especially the source of the first transistor, at the side of the secondary winding, is switched between a high positive and a high negative voltage. The present invention provides a technique for switching the gate of this first transistor with respect to its source.

According to a first aspect, the present invention provides a bi-directional switch having first and second transistors and a floating supply capacitor associated with the second transistor, wherein the gate of the first transistor and/or the supply of its gate drive circuit is charged by the floating supply capacitor at a predetermined moment in the switching cycle.

In one embodiment, the predetermined moment is when the voltage across the bi-directional switch is a minimum.

In this way, the gate of the first transistor is charged in an accurate, safe and efficient manner without the need for a transformer. It is achieved with the lowest possible conduction losses and the gate voltage of the first transistor will be almost equal to the floating supply voltage of the second transistor, which in its turn is almost equal to the supply voltage or any other voltage source from which it is charged.

In one embodiment, a first floating supply capacitor is associated with the first transistor of the bi-directional switch and a second floating supply capacitor is associated with the second transistor of the bi-directional switch. The first floating supply capacitor is arranged to take charge from the second floating supply capacitor by connecting the top plates of the floating capacitors together with a switch every time that the bottom plates are connected together.

The bottom plates are connected together when both the first and second transistors are switched on or when the body diode of the first transistor conducts and second transistor is on.

In another embodiment, the first and second transistors of the bi-directional switch are connected together in anti-series between a first node and a second node, and the floating supply capacitor is connected between a floating supply node and the second node connected to the second transistor, wherein the floating supply capacitor is connected to charge a drive circuit of the first transistor. Typically, the drive circuit of the first transistor comprises a transistor and a diode coupled in series between the floating supply node and the gate of the first transistor, and directly drives the gate of the first transistor in response to receiving charge from the floating supply capacitor.

In a further embodiment, the first and second transistors of the bi-directional switch are connected together in anti-series between a first node and a second node, and the first floating supply capacitor is connected between a first floating supply node and the first node connected to the first transistor, the second floating supply capacitor is connected between a second floating supply node and second node connected to the second transistor, wherein a boost switch is provided for coupling together the first and second floating supply nodes. Typically, a drive circuit is connected in parallel with the first floating supply capacitor to drive the gate of the first transistor.

The boost switch may comprise a pair of high voltage components comprising at least one transistor, and the drive circuit of the first transistor may include a latch and a buffer.

In accordance with the second aspect, the present invention provides a switched mode power converter comprising a bi-directional switch in accordance with the first aspect of the present invention connected to one end of a winding of a secondary side of a transformer thereof.

In one embodiment, the bi-directional switch is connected to the high side of the transformer of the switched mode power converter.

Further preferred and optional features of the present invention will be apparent from the following description and the accompanying claims.

Embodiments of the present invention will now be described, by way of example, with reference to the accompanying drawings, in which.

Figure 4:
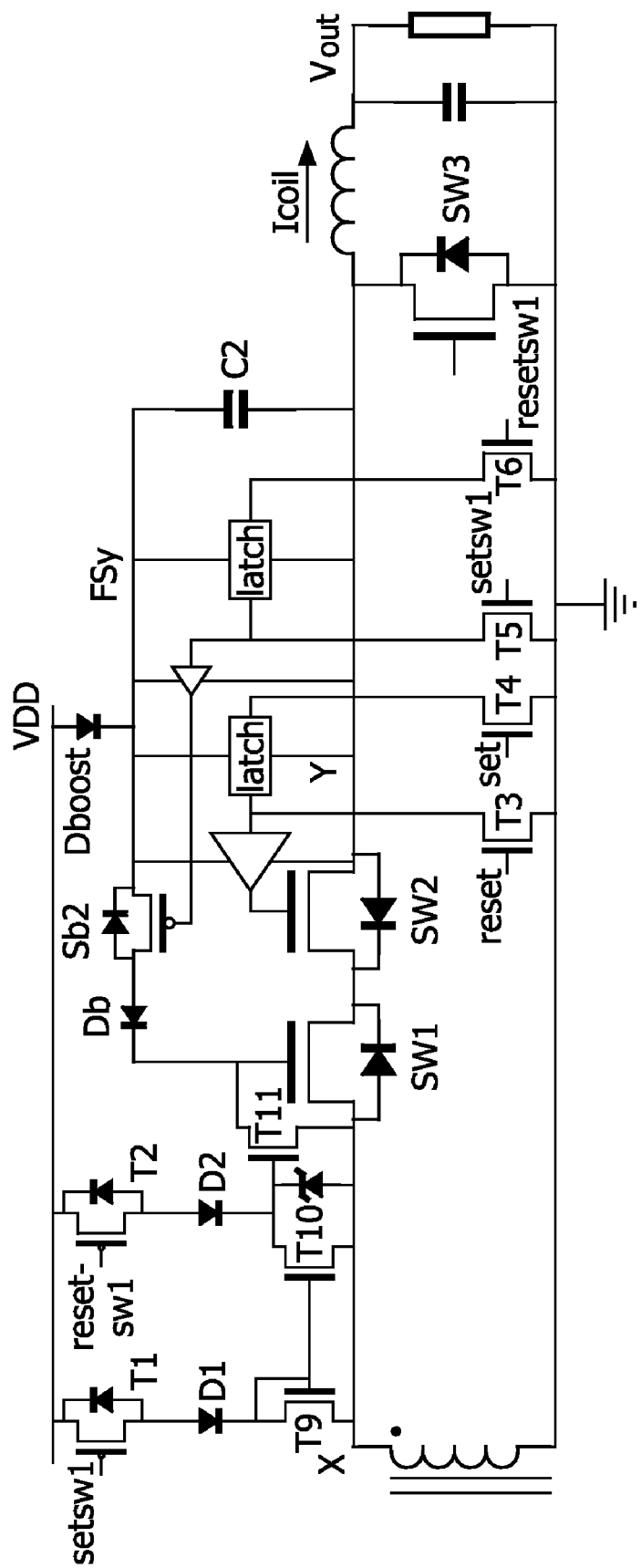
FIG. 4 is a circuit diagram illustrating a technique for controlling the circuit of FIG. 1 using a single boost (floating supply) capacitor in accordance with an embodiment of the present invention.

FIG. 4 illustrates how the gate of first transistor SW1 of a bi-directional switch of a power converter can be driven without a transformer and without having its own floating supply capacitor, in accordance with an embodiment of the present invention. Second transistor SW2 is driven according to a well known boosting principle. In particular, a floating supply capacitor C2 (also known as a "boost" capacitor) provides a floating supply for the drive circuit of transistor SW2. A buffer to drive transistor SW2 consists of low voltage transistors, which are smaller and have more drive capability than high voltage transistors. The value of floating supply capacitor C2 should preferably be at least an order of magnitude larger than the gate capacitance of the transistor SW2 that has to be driven.

In accordance with the present invention, the floating supply of transistor SW2, floating supply capacitor C2, is also used to charge the gate of transistor SW1. The circuit configuration is arranged so that at the moment that transistor SW2 is switched on, and nodes X and Y are above a certain positive voltage, the gate of transistor SW1 is charged by the floating supply capacitor C2 via high voltage PMOS transistor Sb2 and high voltage diode Db. In particular, at the moment when transistor SW2 is switched on, the voltage across nodes X and Y reduces to substantially a minimum (the voltage across the bi-directional switch dropping one forward diode voltage lower when transistor SW1 is switched on). Thus, the drive circuit for the gate of transistor SW1 charges when the voltage across the bi-directional switch is substantially a minimum.

The remainder of the switching cycle proceeds as follows. When node Y falls below a certain positive voltage, transistor SW1 is switched off again by low voltage transistor T11. This transistor can be switched on and off by current pulses generated by transistors T2 and T1 respectively. Transistors T9, T10 and T11 can be low voltage transistors and T1 and T2 are high voltage transistors. High voltage diodes D1 and D2 block when node X goes above $V_{DD}$. The skilled person will appreciate that the present invention is not limited to the circuit arrangement of transistors and diodes as illustrated in FIG. 4. Rather, many equivalent circuit arrangements are possible.

The arrangement shown in FIG. 4 uses integral high voltage transistor Sb2 and diode Db. High voltage transistors are relatively large and/or have less drive capability than low voltage transistors, and high voltage diodes have a higher series resistance than low voltage ones. In the arrangement of FIG. 4, large values for Db and SB2 must be chosen, with consequent high costs and consumption of valuable die area, otherwise the switching speed of transistor SW1 will be slow.

Figure 5:
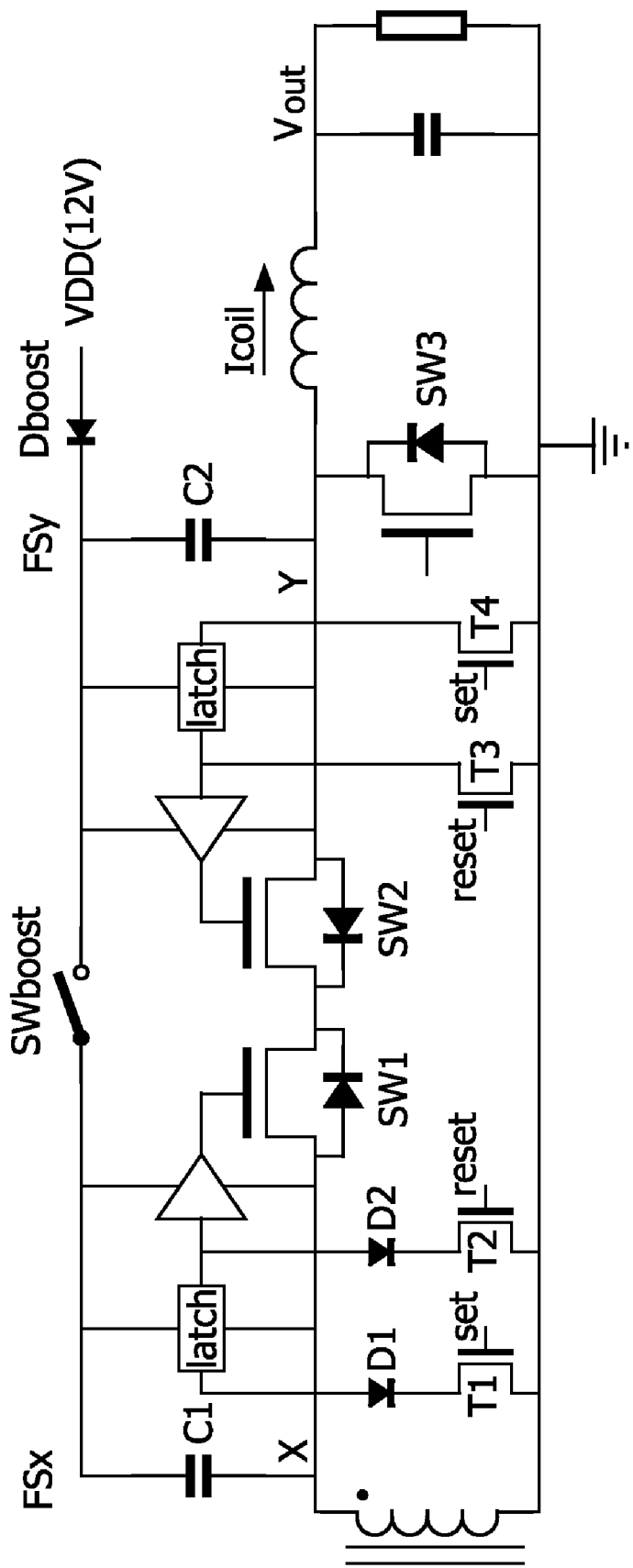
FIG. 5 is a schematic circuit diagram illustrating a technique for controlling the circuit of FIG. 1 using two floating supply capacitors in accordance with a preferred embodiment of the present invention.

Accordingly, an arrangement for driving the gate of first transistor SW1 of a bi-directional switch according to a more advantageous embodiment of the present invention is shown in FIG. 5. This arrangement reduces the need for the high voltage transistor and diode.

As shown in FIG. 5, first and second small external capacitors C2 and C1 are used to form respective floating power supplies for first and second transistors SW1 and SW2 of the bi-directional switch. The value of these capacitors C1, C2 should preferably be at least an order of magnitude larger than the gate capacitance of the respective transistor SW1, SW2 that it drives. Node FSx is a floating supply voltage with respect to node X and node FSy is a floating supply voltage with respect to node Y. A first buffer for switching the gate of first transistor SW1 has its supply connection to node FSx and its ground connection to node X, so that it switches the gate of first transistor SW1 between node X, which is the source of first transistor SW1, and node FSx, which is about a supply voltage above this source. A second buffer for switching the gate of second transistor SW2, has its supply connection to FSy and its ground connection to node Y, so that it switches the gate of second transistor SW2 between node Y, which is the source of second transistor SW2, and node FSy, which is about a supply voltage above this source.

The first and second buffers are formed from low voltage transistors and are controlled by respective first and second latches, which have the same supply and ground connections as the first and second buffers. The latches can be set and reset by short current pulses created by high voltage transistors T1 to T4. High voltage diodes D1 and D2 block when the latch inputs go below ground when node X goes negative. The breakdown voltage of diodes D1, D2 and transistors T1 to T4 should be the same as that of the power switches SW1 and SW2.

Figure 1:
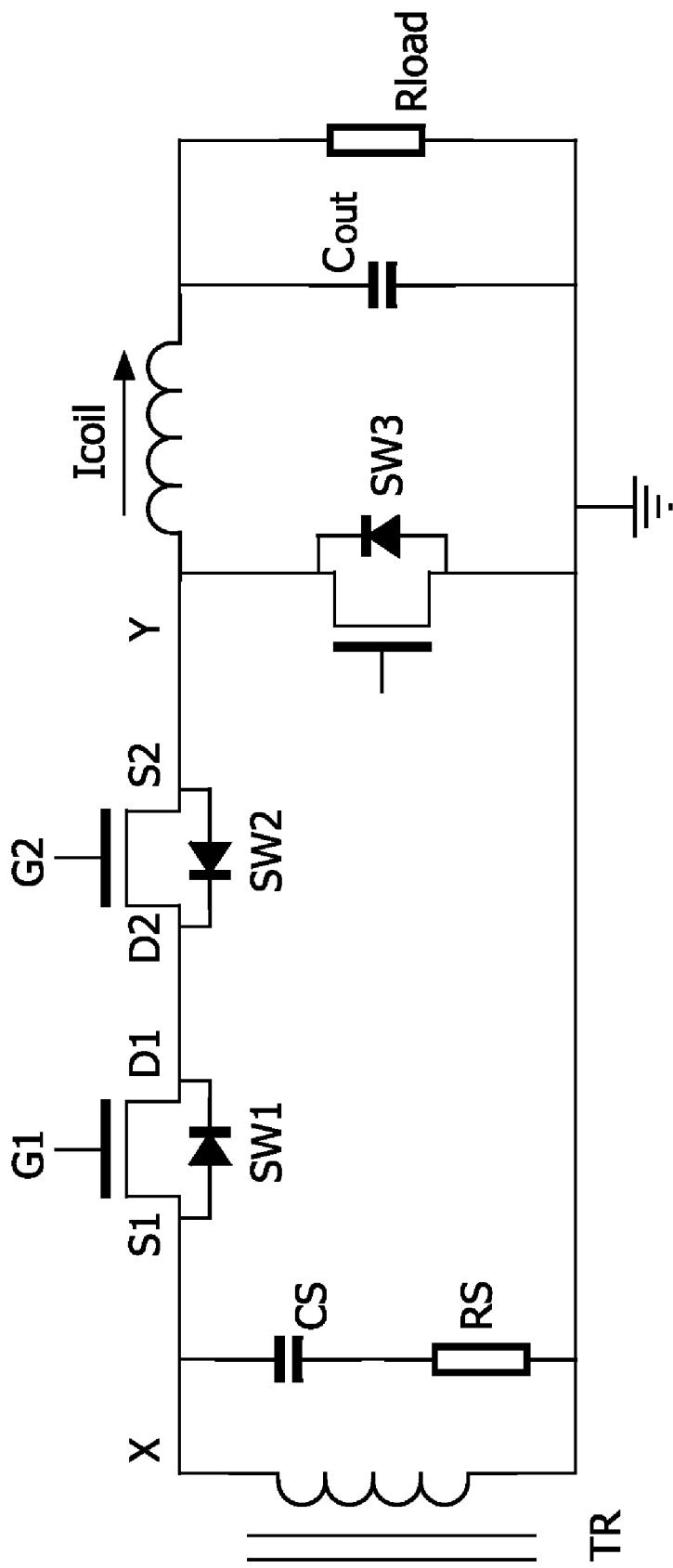
FIG. 1 is a circuit diagram illustrating the secondary side of a forward converter as described in co-pending European Patent Application No 05 101 931.3.
Figure 2:
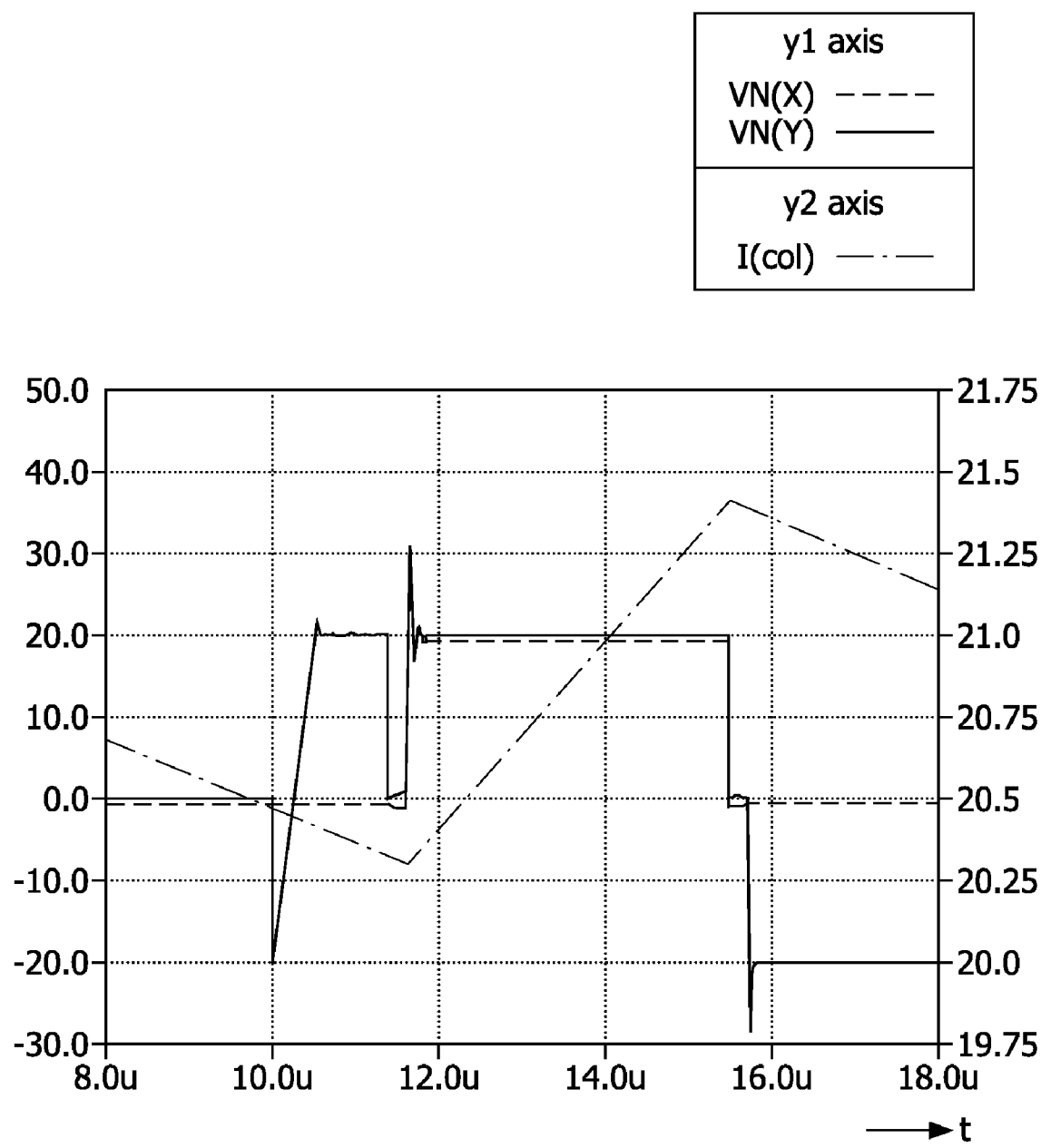
FIG. 2 is a graph showing exemplary signal waveforms generated in a switching cycle during the operation of the circuit of FIG. 1.
Figure 3:
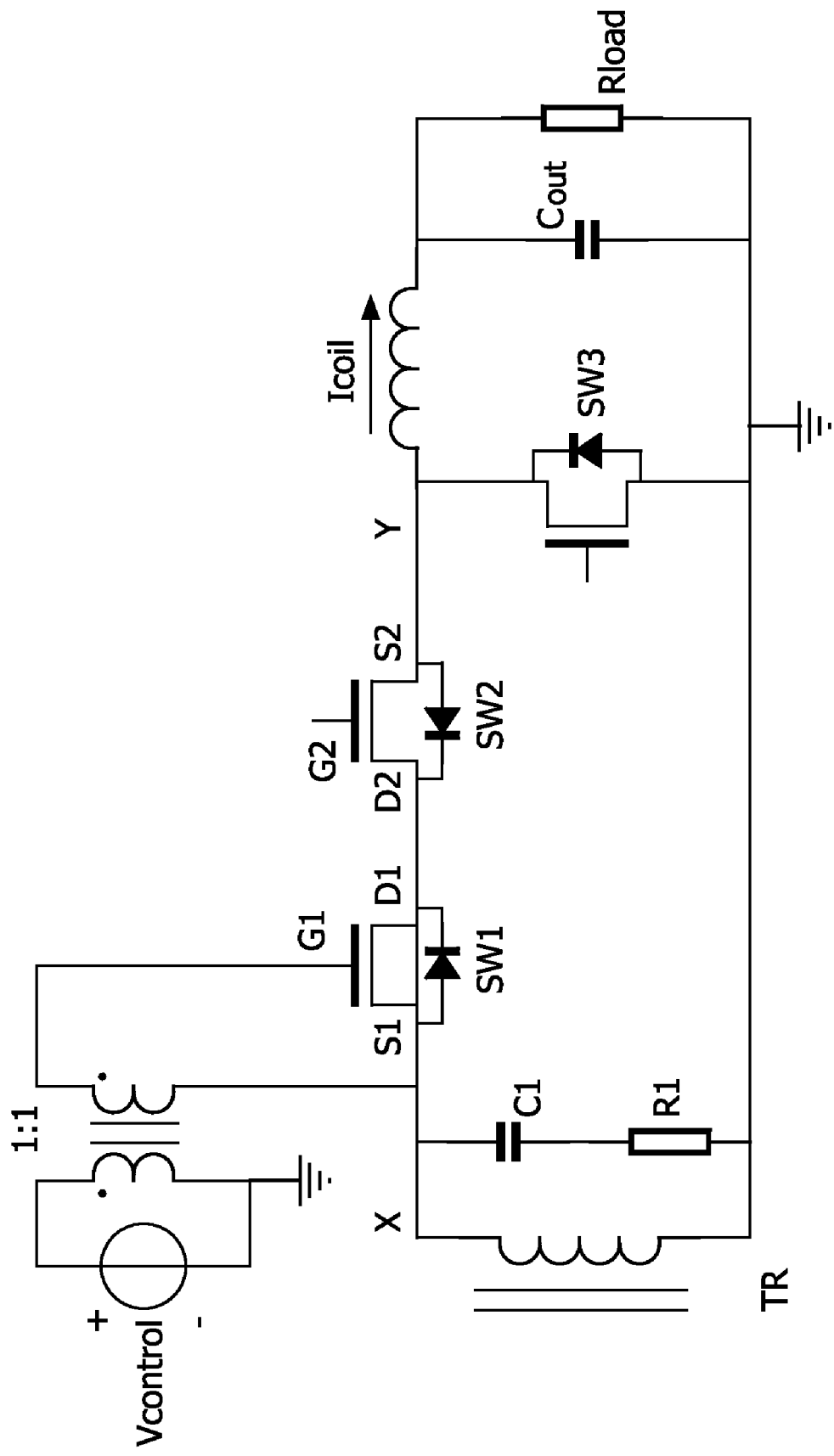
FIG. 3 is a circuit diagram illustrating a known arrangement for controlling the circuit of FIG. 1.

Floating supply capacitor C2 is charged in accordance with a conventional boosting scheme. In particular, every time node Y is driven to ground the capacitor C2 is charged to almost VDD through the boost diode $D_{boost}$ of the second transistor SW2. However, the capacitor C1 is charged in a safe and energy efficient manner in accordance with the present invention. In particular, at a predetermined moment during the switching cycle, capacitor C1 is charged by taking charge from capacitor C2. This may be achieved by connecting the top plates of capacitors C1 and C2 together with a boost switch $SW_{boost}$. The bottom plates of capacitors C1 and C2 are connected together when both transistor SW1 and transistor SW2 are switched on or when the body diode of transistor SW1 conducts and transistor SW2 is on. Thus, referring back to the signal waveforms of FIG. 2, transistor SW1 is on in the time interval t=11.6 us to t=15.5 us and transistor SW2 is on in the time interval t=11.4 us to t=15.7 us. Accordingly, in this example, the best time interval to connect the two capacitor top plates, by operating switch $SW_{boost}$, is from t=11.6 us to t=15.5 us. Alternatively, the two capacitor top plates may be connected together by switching boost switch $SW_{boost}$ in the time interval between t=11.4 us and t=15.7 us.

In both of these time intervals, the voltage across the bi-directional switch is substantially a minimum.

It should be noted that in the embodiment of FIG. 5 the charging of floating supply capacitor C2 may not necessarily be concurrent with driving the gate of transistor SW1, which may occur later in the switching cycle by controlling the latch. However, in some implementations, it may be desirable to charge the gate of transistor substantially concurrently with the charging of the capacitor C2 using switch $SW_{boost}$.

The switch $SW_{boost}$ should preferably be capable of blocking current in both directions and passing current in at least one direction, namely from capacitor C2 to capacitor C1. $SW_{boost}$ can be implemented in various forms and four possible implementations of the switch, and the way in which it is controlled, will be described in detail below with reference to FIGS. 7 to 12.

Generally, these four possible implementation are as follows.

Figure 6:
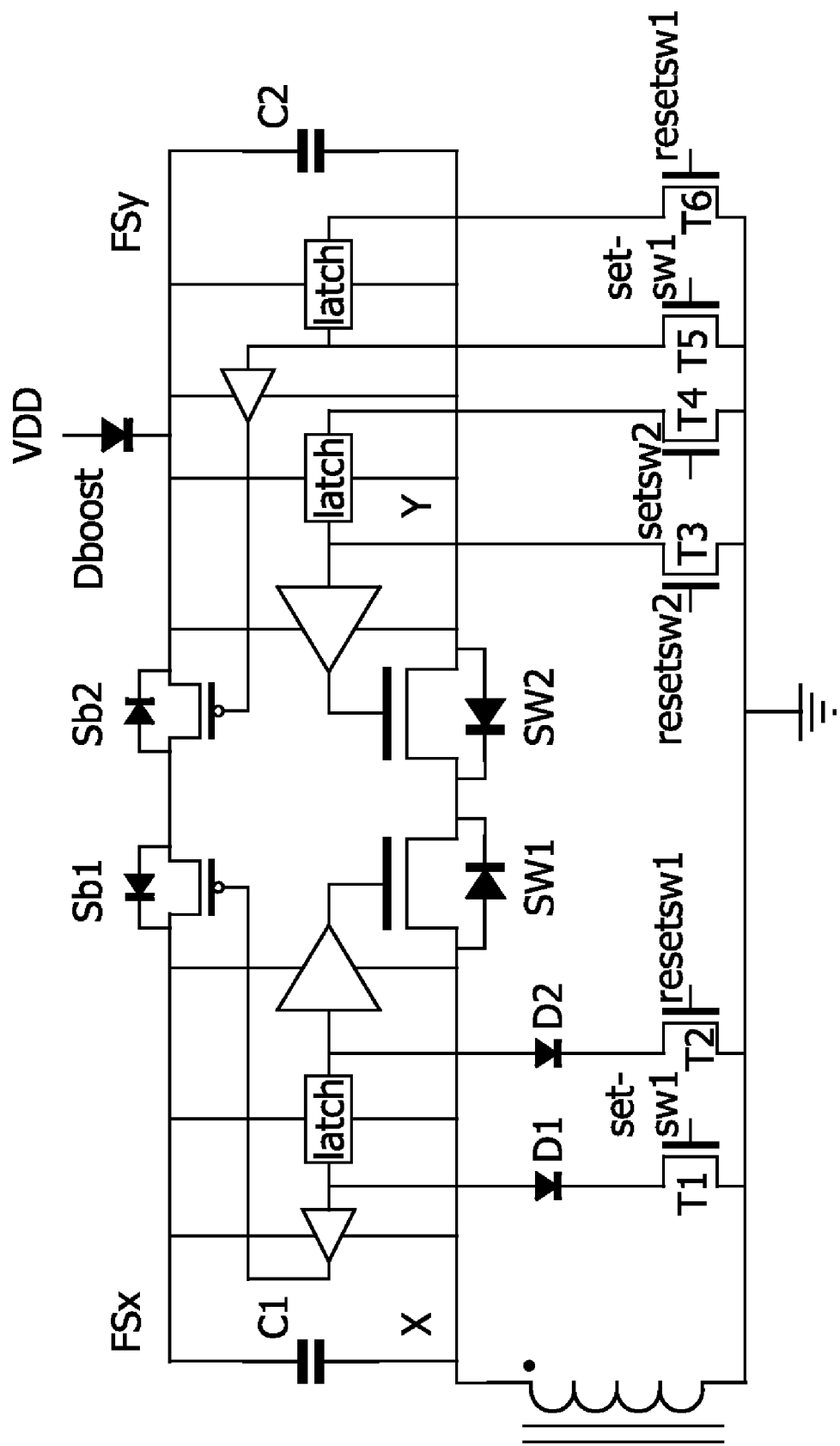
FIG. 6 is a circuit diagram illustrating a first implementation of the arrangement of FIG. 5.

In a first implementation, the boost switch comprises two high voltage PMOS transistors connected in anti-series with their drains connected together, as illustrated in FIG. 6.

Figure 7:
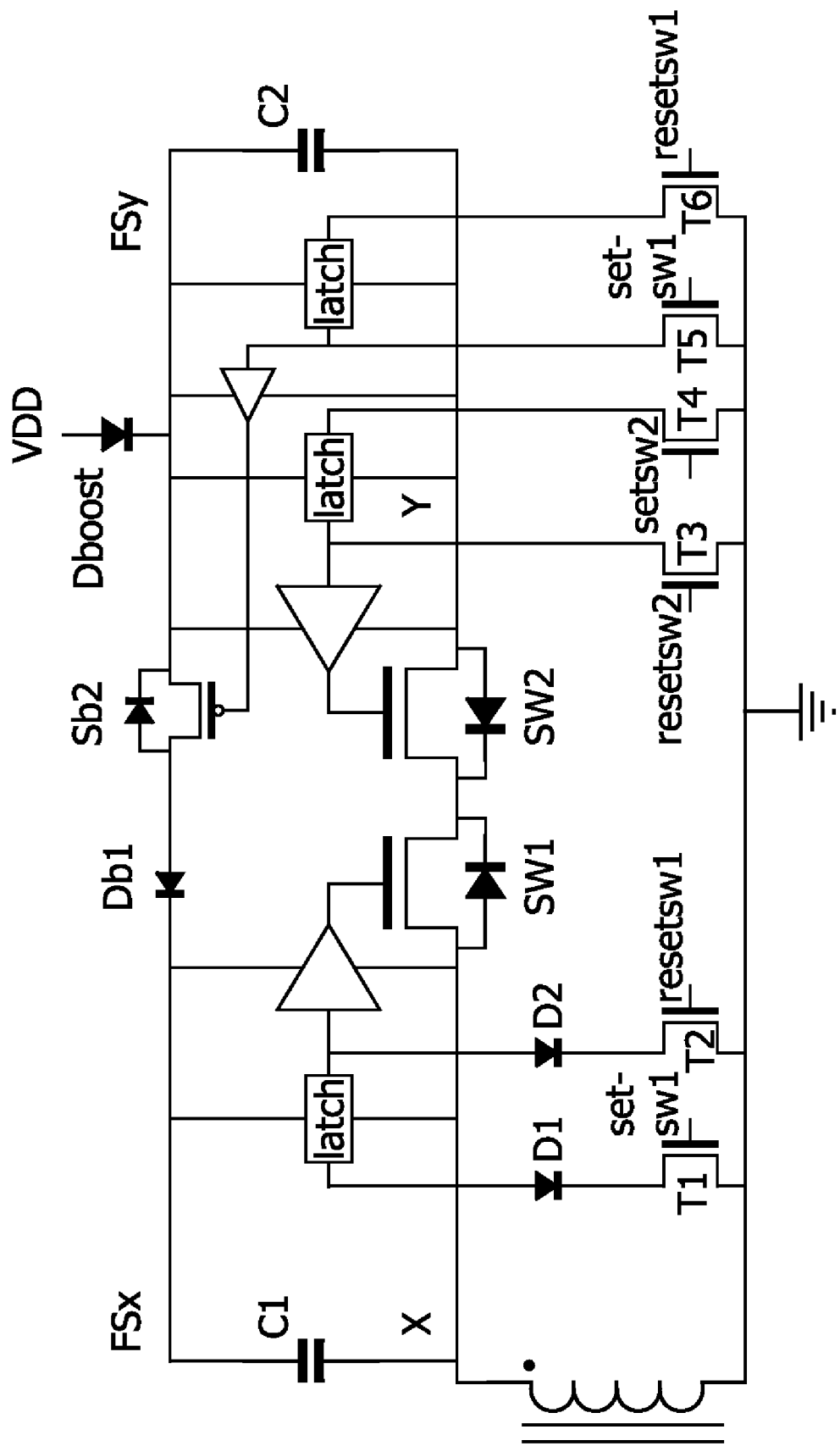
FIG. 7 is a circuit diagram illustrating a second implementation of the arrangement of FIG. 5.

In a second implementation, the boost switch comprises a high voltage PMOS transistor and a high voltage diode connected in series as illustrated in FIG. 7.

Figure 8:
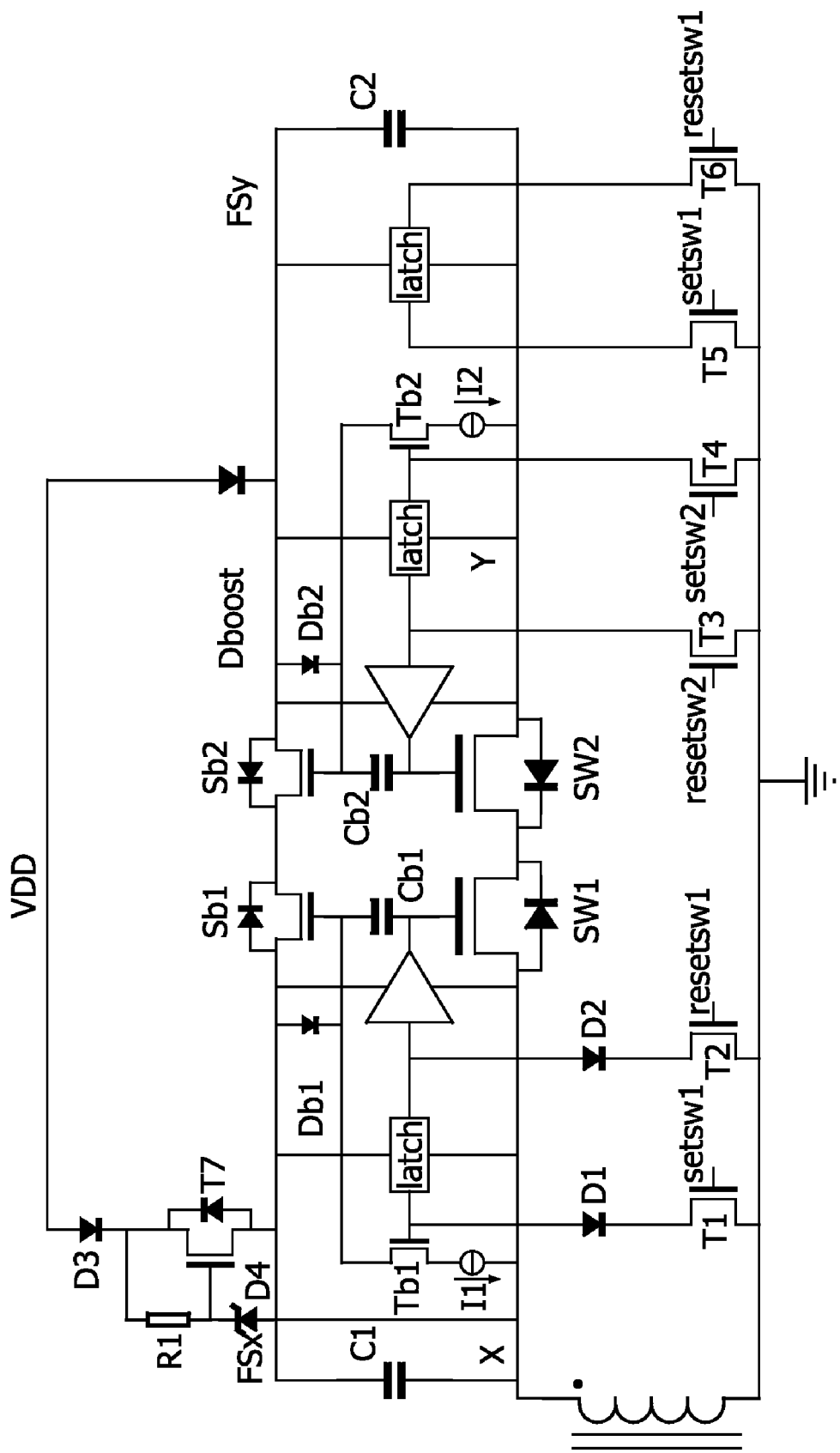
FIG. 8 is a circuit diagram illustrating a third implementation of the arrangement of FIG. 5.

In a third implementation, the boost switch comprises two high voltage NMOS transistors connected in anti-series with their drains connected together, as illustrated in FIG. 8.

Figure 9:
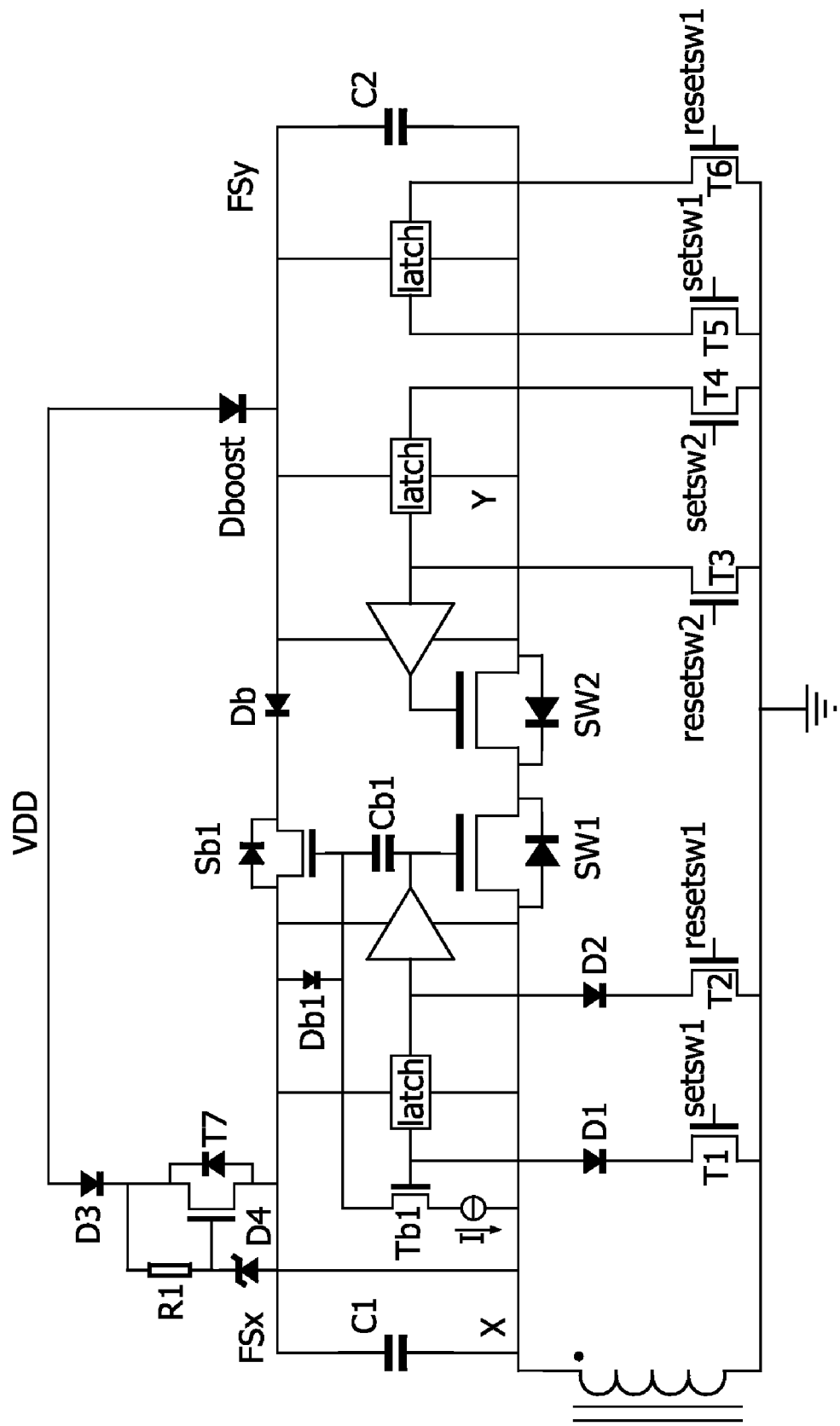
FIG. 9 is a circuit diagram illustrating a fourth implementation of the arrangement of FIG. 5.

In a fourth implementation, the boost switch comprises a high voltage NMOS transistor and a high voltage diode connected in series as illustrated in FIG. 9.

It should be noted that whilst these implementations advantageously utilise high voltage devices, this is not essential to the present invention. It is equally possible to use conventional transistor and/or diode devices.

FIG. 6 shows the implementation with a pair of PMOS transistors Sb1, Sb2 connected in anti-series. Transistors Sb1 and Sb2 are high voltage PMOS transistors with a breakdown voltage substantially equal to that of the power switches SW1 and SW2. High voltage transistors are used to withstand the high voltages that arise. Suppose transistor SW1 is closed only when nodes X and Y are positive and when transistor SW2 is closed. Transistors Sb1 and Sb2 can then be opened and closed at the same time as transistor SW1, as indicated in FIG. 6. At start up when the voltage across floating supply capacitor C1 is zero or very low, transistors SW1 and Sb1 cannot be switched and should even be held off deliberately until the voltage across floating supply capacitor C1 has a sufficiently high value. Capacitor C1 is then charged via the back gate of PMOS transistor Sb1 when PMOS transistor Sb2 is switched on.

FIG. 7 illustrates another way to implement $SW_{boost}$ in which the PMOS transistor Sb1 of FIG. 6 is replaced with a diode Db1. This has the advantage that the diode Db1 does not have to be controlled, but the arrangement is a little less efficient because of the larger voltage drop.

It will be appreciated that the boost switch $SW_{boost}$ can also be implemented with high voltage NMOS transistors, and an implementation with NMOS transistors is illustrated in FIG. 8. In the arrangement of FIG. 8, since $SW_{boost}$ is a high side switch, the gates of the NMOS transistors Sb1, Sb2 should be boosted sufficiently above their source to be switched on. Floating supply capacitor C1 can only be charged when NMOS transistor Sb1 is on, but when the voltage on floating supply capacitor C1 at start up is very low, it cannot be switched and should even be held off deliberately until the voltage across floating supply capacitor C1 has a sufficiently high value. Thus an extra charge path is used comprising high voltage diode D3, high voltage NMOS transistor T7, high ohmic resistor R1 and zener diode D4. This charge path is active when the voltage across floating supply capacitor C1 is lower than the zener voltage of diode D4 minus the threshold voltage of transistor T7 and when node X is zero or at a negative voltage. When floating supply capacitor C1 is properly charged, this extra charge path is automatically cut off.

As the skilled person will recognise, if this additional charge path were used as the normal charge path during normal operation and the negative voltage level at node X were for example −60V and VDD=12V, the gate drive loss to drive SW1 would be five times the loss compared to when floating supply capacitor C1 is charged from capacitor C2, as is described above in accordance with the present invention. If VDD were 5V, for example, the loss would be about twelve times as much. This will become more important at higher switching frequencies.

As shown in FIG. 8, an internal boost capacitor Cb1 is charged from node FSx, via a diode Db1, when SW1 is off. Similarly, an internal boost capacitor Cb2 is charged from node FSy, via a diode Db2, when SW2 is off. When transistor SW1 is switched on, the gate of NMOS transistor Sb1 is pushed above node FSx by floating supply capacitor Cb1 and when transistor SW2 is switched on, the gate of NMOS transistor Sb2 is pushed above node FSy by floating supply capacitor Cb2. Additional transistor Tb1 only provides a reliable determination of the low level voltage of the gate of NMOS transistor Sb1 and is switched off when floating supply capacitor Cb1 is lifted. The current sources I1 and I2 can be very small. Additional transistor Tb2 does the same for the gate voltage of NMOS transistor Sb2 and is switched off when floating supply capacitor Cb2 is lifted. Switch SB2 can be replaced by a diode Db as illustrated in FIG. 9.

Figure 10:
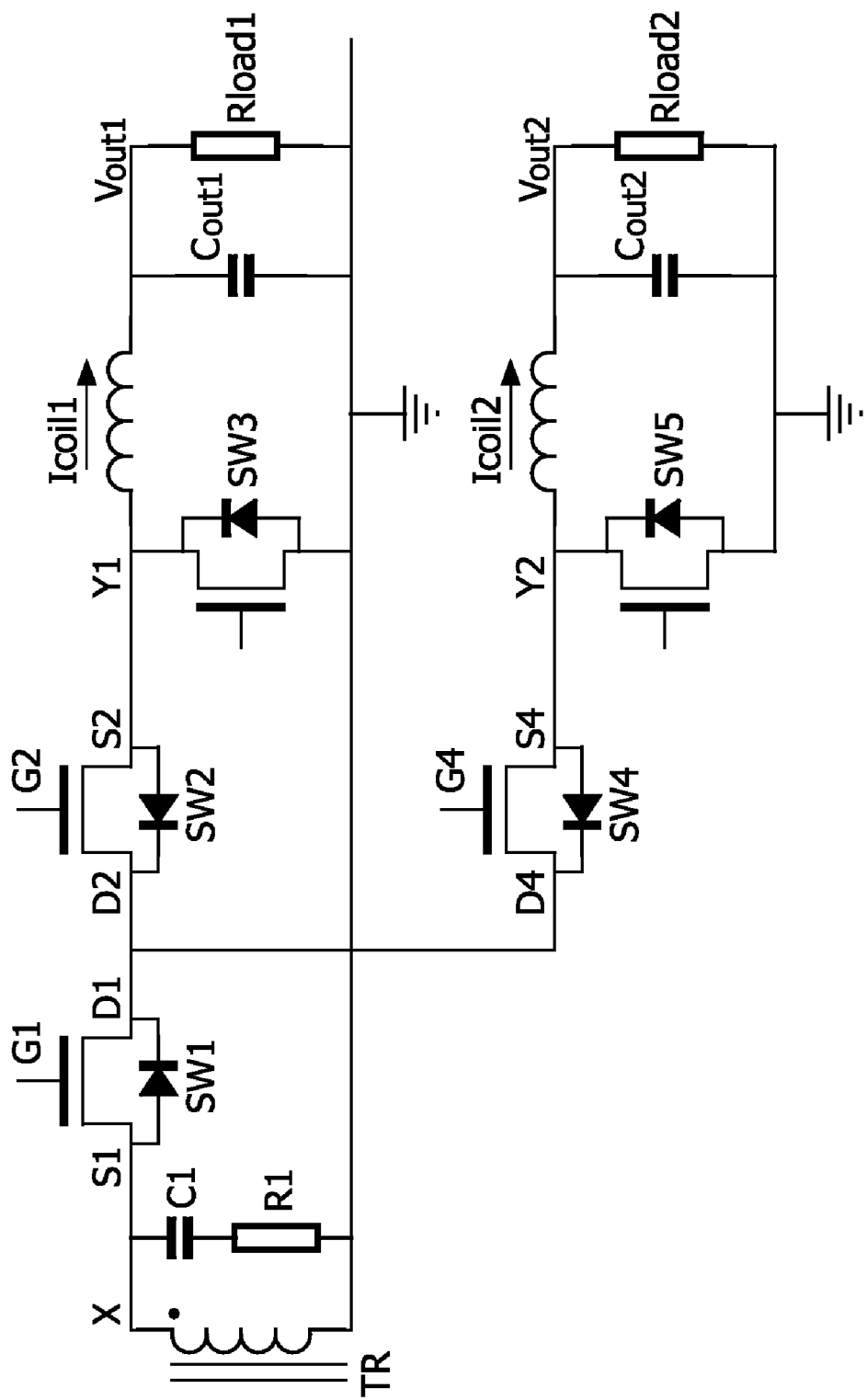
FIG. 10 is a circuit diagram similar to FIG. 1 illustrating an arrangement for taking two independent outputs from the same secondary winding of a forward converter.

As already mentioned, in the above described implementations, the bi-directional power switch is placed at the high side of the secondary transformer winding. This enables several independent outputs to be taken from the same secondary transformer winding. This is illustrated in FIG. 10. The external vertical DMOS power transistors SW1, SW2 and SW4 can be integrated into one chip.

Figure 11:
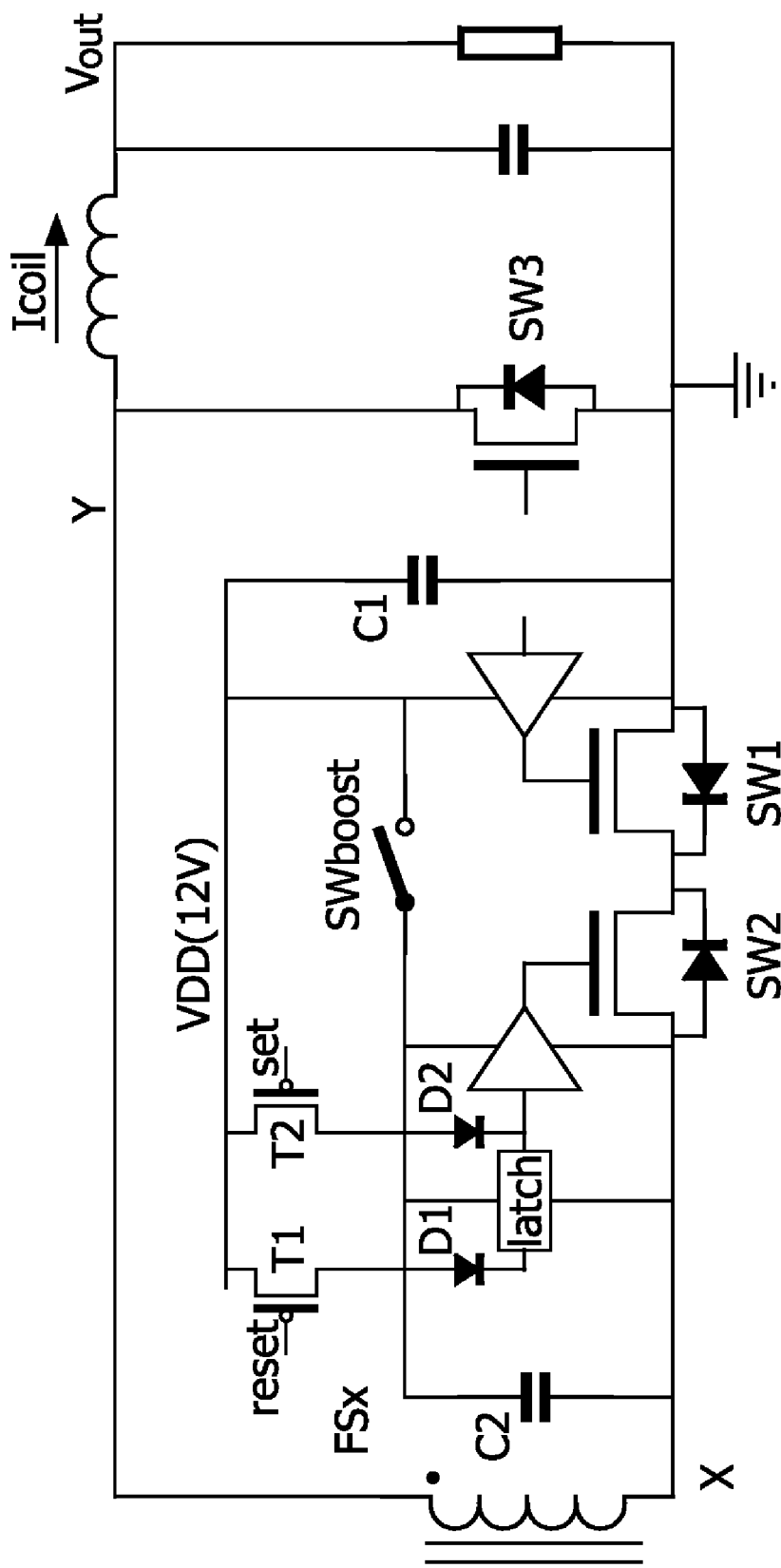
FIG. 11 is a circuit diagram illustrating a further embodiment of the present invention.
Figure 12:
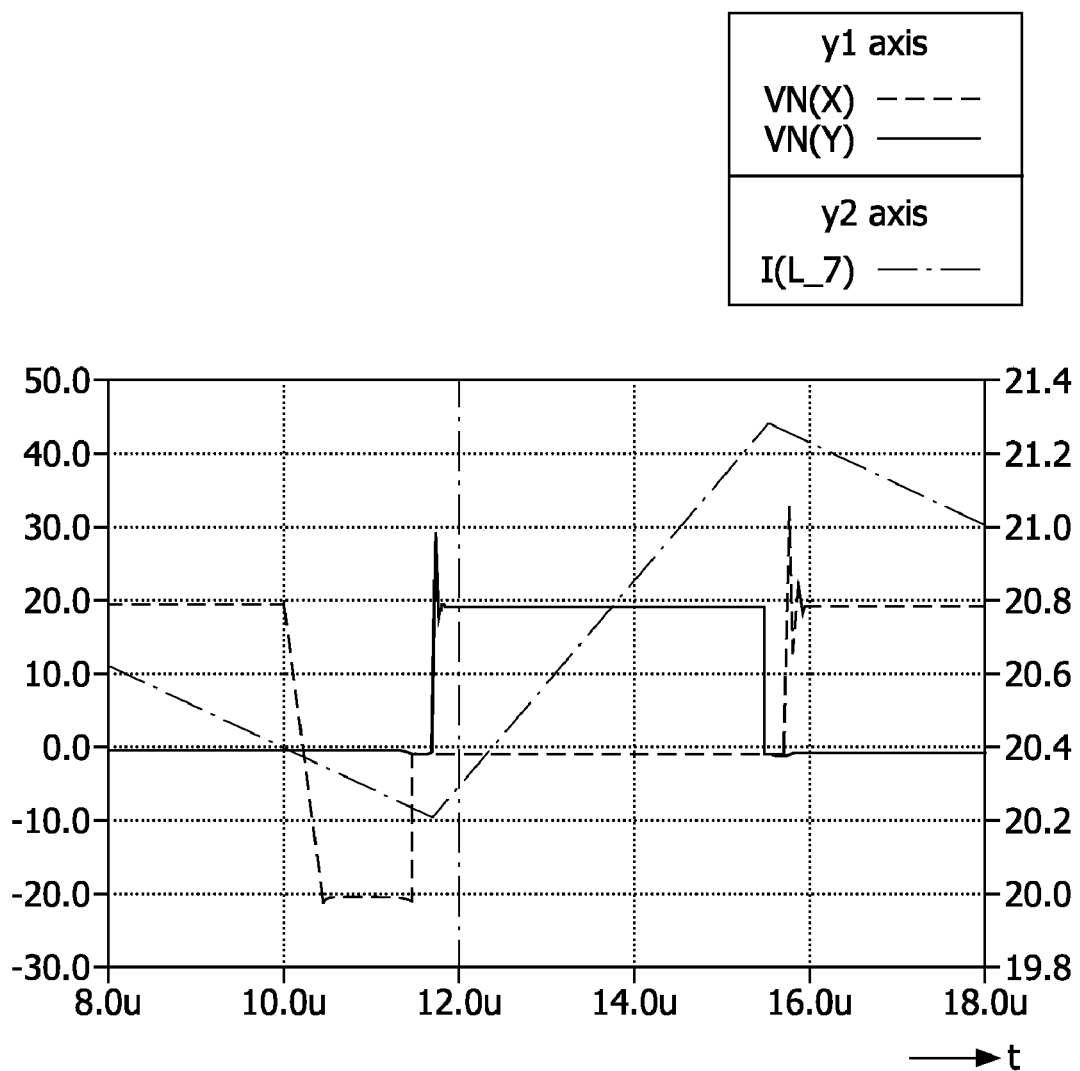
FIG. 12 is a graph showing exemplary signal waveforms generated in a switching cycle during the operation of the circuit of FIG. 11.

When the bi-directional power switch is placed at the low side of the secondary transformer winding, as illustrated in FIG. 11, the techniques of the invention can be applied in almost the same way. The voltages at nodes X and Y when using a low side bi-directional power switch are as illustrated in FIG. 12.

Switch $SW_{boost}$ can be switched on when node X is at ground level or when node Y is above a certain positive voltage. SW2 has to be switched on when node X is at a large negative voltage, so its latch is set by high voltage PMOS transistors T1 and T2. High voltage diodes D1 and D2 block when a latch input goes above VDD when node X goes positive. Switch $SW_{boost}$ can be implemented in much the same way as described for the high side bi-directional power switch.

Accordingly, the present invention provides a means for the control of a bi-directional switch at the secondary side of an isolated switched-mode power converter. The bi-directional switch is connected at the secondary winding of the transformer of the power converter, and this node switches between a large positive and a large negative voltage. The problem is how to switch the bi-directional switch on and off under these conditions. The present invention provides a solution to this problem, without the need for an additional transformer, by providing an arrangement in which a floating supply capacitor charges the gate of the first transistor connected to this node, at an appropriate moment in the switching cycle. In one embodiment, two independent floating supplies are used for respective parts of the bi-directional switch. A special boosting technique is used to feed these floating supplies, and in particular, the supply at the side of the secondary transformer winding is charged from the other floating supply at the moment that the bi-directional switch is closed and both floating supplies are at a large positive voltage. In embodiments, the charging takes place when the voltage across the bi-directional switch (first and second transistors) is substantially a minimum. Thus, in embodiments where the bi-directional switch is connected high side (e.g. FIGS. 6-9), this is the moment when the voltage across nodes X and Y is substantially a minimum, whereas in embodiments where the bi-directional switch is connected low side (e.g. FIG. 11), this is the moment when the voltage of node X with respect to ground is substantially a minimum.

As the skilled person will appreciate, various modifications and changes can be made to the described embodiments. For example, whilst the described embodiments implement the invention in the form of a forward converter, it may equally well be implemented in other kinds of power converters. The present invention extends to all such variations that fall within the scope of the present invention as defined in the accompanying claims.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

The invention claimed is:

1. A bi-directional switch for a power converter comprising first and second transistors and a floating supply capacitor, wherein the first and second transistors are connected together in anti-series between a first node and a second node, the first transistor connected to the first node and the second transistor to the second node, and the floating capacitor is connected between a floating supply node and the second node connected to the second transistor, wherein the floating capacitor is connected to charge a drive circuit dedicated to the first transistor at a predetermined moment in the switching cycle of the bi-directional switch.

2. A bi-directional switch as claimed in claim 1, wherein the predetermined moment in the switching cycle is when the voltage across the bi-directional switch is substantially a minimum.

3. A bi-directional switch as claimed in claim 1, wherein the drive circuit of the first transistor comprises a transistor and a diode coupled in series between the floating supply node and the gate of the first transistor.

4. A bi-directional switch as claimed in claim 3, wherein the drive circuit directly drives the gate of the first transistor in response to receiving charge from the floating supply capacitor.

5. A bi-directional switch for a power converter comprising first and second transistors and a first floating supply capacitor and a second floating supply capacitor, wherein the first and second transistors are connected together in anti-series between a first node and a second node, the first transistor connected to the first node and the second transistor to the second node, the first floating supply capacitor is connected between a first floating supply node and the first node connected to the first transistor, the second floating supply capacitor is connected between a second floating supply node and the second node connected to the second transistor, wherein a switch is provided for coupling together the first and second floating supply nodes.

6. The bi-directional switch as claimed in claim 5, wherein the switch connected between respective first plates of the first floating supply capacitor and the second floating supply capacitor is operable to electrically connect the respective first plates of the first and second floating supply capacitors so that the first floating supply capacitor takes charge from the second floating supply capacitor.

7. A bi-directional switch as claimed in claim 6, wherein the switch is operated when the respective second plates of the first and second floating supply capacitors are connected together.

8. A bi-directional switch as claimed in claim 5, wherein a drive circuit is connected in parallel with the first floating supply capacitor to drive the gate of the first transistor.

9. A bi-directional switch as claimed in claim 8, wherein the drive circuit of the first transistor includes a latch and a buffer.

10. A bi-directional switch as claimed in claim 5, wherein the switch comprises a pair of high voltage components comprising at least one transistor.

11. A switched mode power converter comprising a bi-directional switch as claimed in claim 5 connected to one end of a winding of a secondary side of a transformer thereof.

12. A switched mode power converter as claimed in claim 11, wherein the bi-directional switch is connected to the high side of the secondary side of the transformer.

* * * * *